United States Patent
Park et al.

(10) Patent No.: US 10,230,506 B2
(45) Date of Patent: Mar. 12, 2019

(54) SIGNAL TRANSMISSION METHOD FOR INTER-CELL INTERFERENCE

(71) Applicant: LG ELECTRONICS INC., Seoul (KR)

(72) Inventors: Kungmin Park, Seoul (KR); Heejeong Cho, Seoul (KR); Hyunsoo Ko, Seoul (KR); Hyeyoung Choi, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/517,511

(22) PCT Filed: Oct. 7, 2014

(86) PCT No.: PCT/KR2014/009416
§ 371 (c)(1),
(2) Date: Apr. 6, 2017

(87) PCT Pub. No.: WO2016/056686
PCT Pub. Date: Apr. 14, 2016

(65) Prior Publication Data
US 2017/0324526 A1 Nov. 9, 2017

(51) Int. Cl.
*H04L 5/00* (2006.01)
*H04J 11/00* (2006.01)
(Continued)

(52) U.S. Cl.
CPC .......... *H04L 5/0032* (2013.01); *H04B 7/024* (2013.01); *H04B 7/0486* (2013.01); *H04J 11/00* (2013.01);
(Continued)

(58) Field of Classification Search
CPC . H04L 5/0032; H04L 27/2646; H04L 5/0023; H04L 5/0057; H04L 5/0035; H04B 7/024; H04B 7/0486; H04J 11/00; H04J 11/005
USPC ........................................................ 370/329
See application file for complete search history.

(56) References Cited

U.S. PATENT DOCUMENTS 7,920,511 B2 * 4/2011 Khan .................... H04L 1/0026
370/203
2007/0230600 A1 10/2007 Bertrand et al.
(Continued)

FOREIGN PATENT DOCUMENTS

KR 10-2008-0064756 7/2008

OTHER PUBLICATIONS

PCT International Application No. PCT/KR2014/009416, International Search Report dated May 15, 2015, 6 pages.
(Continued)

*Primary Examiner* — Faisal Choudhury
(74) *Attorney, Agent, or Firm* — Lee, Hong, Degerman, Kang & Waimey

(57) ABSTRACT

A signal transmission method for reducing inter-cell interference according to the present invention may comprise the steps of: determining a rank on the basis of feedback information received from a terminal; generating a transmission sequence according to the rank; generating a repetitive transmission sequence by repeating the transmission sequence, and shifting a position of a symbol within the repetitive transmission sequence; and transmitting the transmission sequence and the repetitive transmission sequence. As a result, the present invention can implement an inter-cell interference randomization even in a closed-loop MINO.

8 Claims, 19 Drawing Sheets

(51) Int. Cl.
*H04L 27/26* (2006.01)
*H04B 7/024* (2017.01)
*H04B 7/0456* (2017.01)
*H04W 4/00* (2018.01)

(52) U.S. Cl.
CPC ......... *H04L 27/2646* (2013.01); *H04J 11/005* (2013.01); *H04L 5/0023* (2013.01); *H04L 5/0035* (2013.01); *H04L 5/0057* (2013.01)

(56) References Cited

U.S. PATENT DOCUMENTS

| | | | | |
|---|---|---|---|---|
| 2010/0284483 | A1* | 11/2010 | Jongren | H04B 7/0697 375/267 |
| 2010/0284484 | A1* | 11/2010 | Jongren | H04B 7/0639 375/267 |
| 2012/0082250 | A1* | 4/2012 | Lee, II | H04B 7/0615 375/259 |
| 2017/0126376 | A1* | 5/2017 | Wang | H04L 5/0044 |

OTHER PUBLICATIONS

Hyun-Ho Lee, et al., "Design on the Interference Alignment Transceiver for Multi-Cell MIMO Downlink Channels," http://dx.doi.org/10.7840/kics.2012.37B.10.921, Oct. 2012, vol. 37B No. 10, 8 pgs.

Afif Osseiran, et al., "Interference Mitigation for MIMO Systems Employing User-specific, Linear Precoding," PIMRC 2008, IEEE 19th International Symposium, Sep. 18, 2008, 6 pgs.

* cited by examiner

FIG. 11A
Cell A
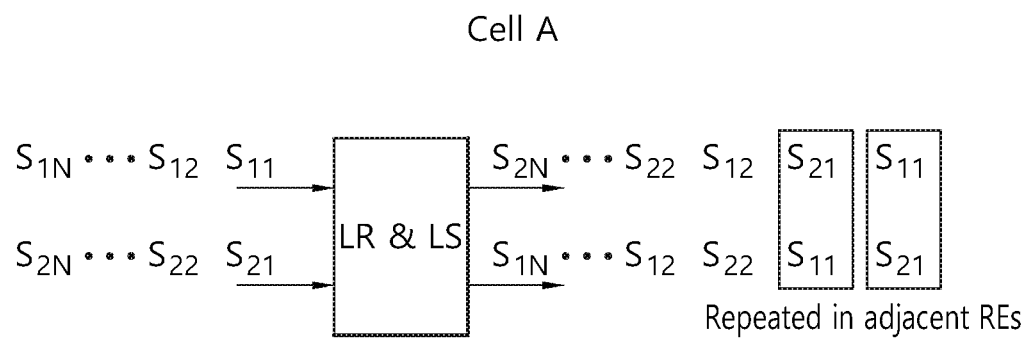
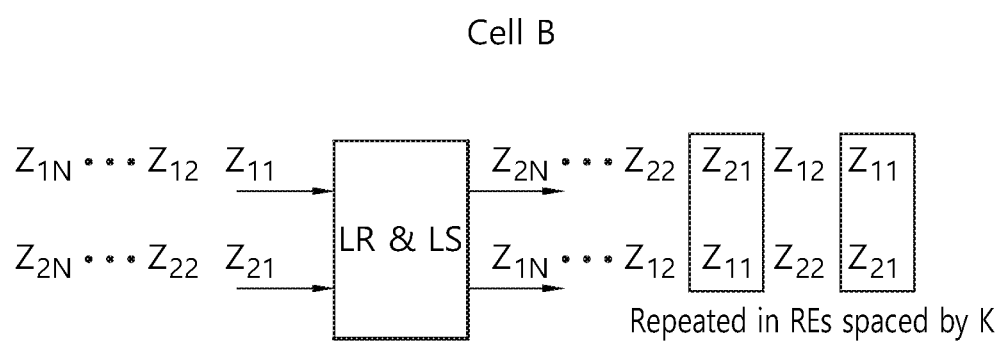

SIGNAL TRANSMISSION METHOD FOR INTER-CELL INTERFERENCE

CROSS-REFERENCE TO RELATED APPLICATIONS

This application is the National Stage filing under 35 U.S.C. 371 of International Application No. PCT/KR2014/009416, filed on Oct. 7, 2014, the contents of which are hereby incorporated by reference herein in its entirety.

BACKGROUND OF THE INVENTION

Field of the Invention

The present invention relates to wireless communications, and more particularly, to a method and a device for transmitting a signal for inter-cell interference.

Related Art

A transmission mode based on orthogonal frequency-division multiplexing access (OFDMA) may independently allocate one or more subcarriers to each user equipment (UE). Thus, it is possible to efficiently allocate frequency resources without intra-cell frequency interference at a UE's request.

In a cellular network system, system performance may significantly change depending on the location of a terminal in a cell. Particularly, inter-cell interference may substantially degrade the performance of a terminal located on the boundary of the cell. Further, with higher frequency reuse efficiency, a high data transmission rate may be obtained in the center of the cell, while inter-cell interference becomes serious. Accordingly, the terminal on the boundary receives significant interference from a neighboring cell and thus has a greater decrease in signal-to-interference-plus-noise ratio (SINR).

In order to mitigate inter-cell interference in an orthogonal frequency-division multiple access (OFDMA) cellular network system, studies have been conducted on techniques for avoiding inter-cell interference, techniques for averaging inter-cell interference effects, and techniques for eliminating inter-cell interference.

In a current cellular network system, there are a large number of moving cells. Inter-cell interference may occur between moving cells and fixed cells. Methods are needed to mitigate interference between moving cells and fixed cells.

SUMMARY OF THE INVENTION

One aspect of the present invention provides a method and a device for mitigating inter-cell interference.

Another aspect of the present invention provides a sequence generation method for mitigating inter-cell interference and a device using the same.

A signal transmission method for mitigating inter-cell interference according to one embodiment of the present invention may include: determining a rank based on feedback information received from a terminal; generating a transmission sequence according to the rank; generating a repetitive transmission sequence by repeating the transmission sequence and shifting a position of a symbol in the repetitive transmission sequence; and transmitting the transmission sequence and the repetitive transmission sequence.

The method may further include creating orthogonality between the transmission sequence and the repetitive transmission sequence by changing a phase of the repetitive transmission sequence with respect to the transmission sequence.

A pattern of repeated symbols in the repetitive transmission sequence may be determined according to a cell identifier (ID).

According to the present invention, there are provided a method and a device for mitigating inter-cell interference.

According to the present invention, inter-cell interference between moving cells having a quickly changing channel state may be mitigated based on precoding of a transmitting end. Specifically, interference signals included reception signals of a receiving end may be averaged to fade out based on precoding of the transmitting end, without the receiving end performing averaging of interference. Further, interference in each of a plurality of reception symbols may be randomized.

According to one embodiment of the present invention, there are provided a sequence generation method for mitigating inter-cell interference and a device using the same.

Further, according to the present invention, there is provided a downlink closed-loop multiple-input multiple-output (MIMO) transmission scheme for overcoming interference through the randomization of unknown inter-cell interference.

BRIEF DESCRIPTION OF THE DRAWINGS

FIG. 11a illustrates a repeated transmission sequence according to one embodiment of the present invention.

DESCRIPTION OF EXEMPLARY EMBODIMENTS

Figure 1:
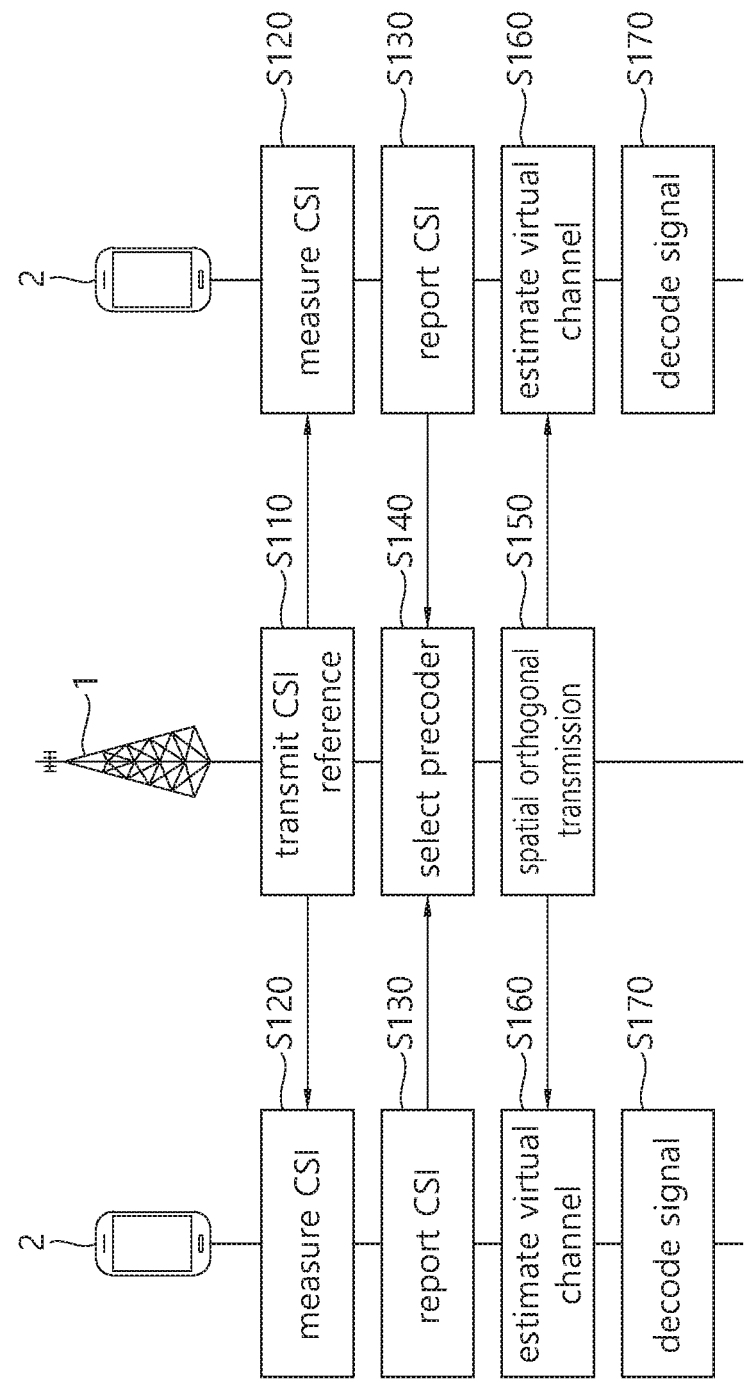
FIG. 1 illustrates a method for resolving interference in closed-loop multiple-input multiple-output (MIMO).

A wireless device may be stationary or mobile and may be denoted by other terms such as, user equipment (UE), mobile station (MS), user terminal (UT), subscriber station (SS), or mobile terminal (MT). Further, the terminal may be a portable device with a communication function, such as a cellular phone, a smartphone, a wireless modem, or a notebook computer, or may be a non-portable device, such as a personal computer (PC) or a vehicle-mounted device. A base station generally refers to a fixed station that communicates with a wireless device and may be denoted by other terms, such as evolved-NodeB (eNB), base transceiver system (BTS), or access point.

Hereinafter, applications of the present invention based on 3rd generation partnership project (3GPP) long term evolution (LTE) or 3GPP LTE-advanced (LTE-A) are described. However, these are merely examples, and the present invention may be applied to various wireless communication systems. Hereinafter, LTE includes LTE and/or LTE-A.

The present specification is described based on a communication network, and operations implemented in the communication network may be performed by a system (for example, a base station) responsible for the communication network in controlling the network and transmitting data or may be performed by a terminal linked to the network.

Recently, the commercialization of an LTE system as a next-generation wireless communication system has been actively supported. Use of this LTE system has been rapidly spreading with the recognition of a need to support not only voice services but also high-capacity services on user's demand with high quality, while guaranteeing the mobility of a terminal user. The LTE system provides low transmission delays, a high transmission rate, a high system capacity, and coverage enhancement.

The appearance of high-quality services drastically increases demands for wireless communication services. To actively deal with such increasing demands, it is first needed to increase the capacity of a communication system. To increase communication capacity in a wireless communication environment, a method of finding a new available frequency band and a method of increasing the efficiency of limited resources may be considered.

As a method of increasing the efficiency of limited resources, a multi-antenna transmission/reception technique has recently attracted great attention and is actively developing, in which a plurality of antennas is installed in a transceiver to obtain an additional spatial area for resource utilization, thus obtaining a diversity gain, or data is transmitted in parallel through each antenna to increase transmission capacity.

In a multiple-input multiple-output (MIMO) system, beamforming and precoding may be used as a method for increasing a signal-to-noise ratio (SNR). Beamforming and precoding are used to maximize an SNR through feedback information in a closed-loop system in which the feedback information is available to a transmitter.

FIG. 1 illustrates a method for resolving interference in closed-loop MIMO.

As illustrated, a base station (BS) 1 may receive a feedback signal on a channel from each terminal 2 in a process of transmitting signals to a plurality of terminals 2.

When the BS 1 transmits a reference signal on channel state information (CSI) (S110), each terminal 2 measures CSI (S120) and transmits the measured CSI to the BS (S130).

The BS 1 selects a precoder for a signal based on such feedback information (S140) and may transmit a precoded signal to the terminals 2.

As illustrated in FIG. 1, the BS 1 may transmit a signal generated by a spatial orthogonal mode to the terminals 2 (S150).

The terminal 2 may estimate a virtual channel on the transmitted signal (S160) and may reconstruct the signal (S170).

That is, a closed-loop MIMO system may adjust a signal based on channel information so that the signal is transmitted to a desired specific terminal, thus resolving intra-cell interference and inter-cell interference (ICI).

This interference mitigation method may mitigate multiple access interference (MAI), and coordinated multipoint (CoMP) between BSs may minimize interference in a terminal-desired antenna direction.

Meanwhile, if channel information is not properly shared between adjacent cells, it is difficult to apply inter-cell interference avoidance through the foregoing closed-loop CoMP technique. When inter-cell interference occurs in a moving cell, which moves fast and thus is unable to quickly establish an interface with a neighboring cell at an appropriate time, or in a femtocell restricted from sharing information with another cell, it is difficult to apply inter-cell interference avoidance through the foregoing closed-loop CoMP technique.

Figure 2:
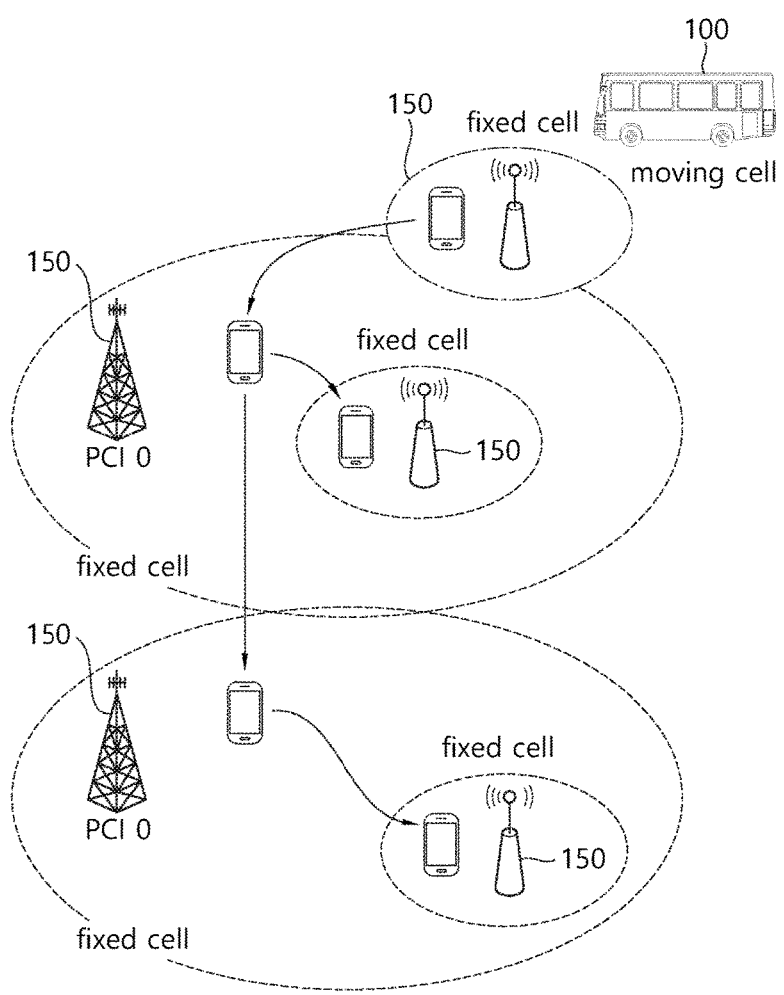
FIG. 2 is a conceptual view illustrating the movement of a moving cell.

FIG. 2 is a conceptual view illustrating the movement of a moving cell.

In the following embodiments, a moving cell may denote a BS that moves, and a fixed cell may denote a BS that remains stationary at a fixed location. A moving cell may be denoted by a moving BS, and a fixed cell may be denoted by a fixed BS.

For example, a moving cell 100 may be a BS installed in a moving object, such as a bus. Based on buses running in Seoul, about 2000 moving cells 100 may be present. Therefore, interference between the moving cells 100 and fixed cells 150 is highly likely to occur in a current cellular network system.

For inter-cell interference (ICI) between fixed cells 150, resource division may be performed in view of the distance between a BS and a terminal in order to mitigate the inter-cell interference. Alternatively, interference may be mitigated by performing dynamic resource division or cooperative communication based on sharing channel information between cells.

However, it is difficult to apply the same methods for controlling interference between fixed cells 150 to the moving cell 100.

Figure 3:
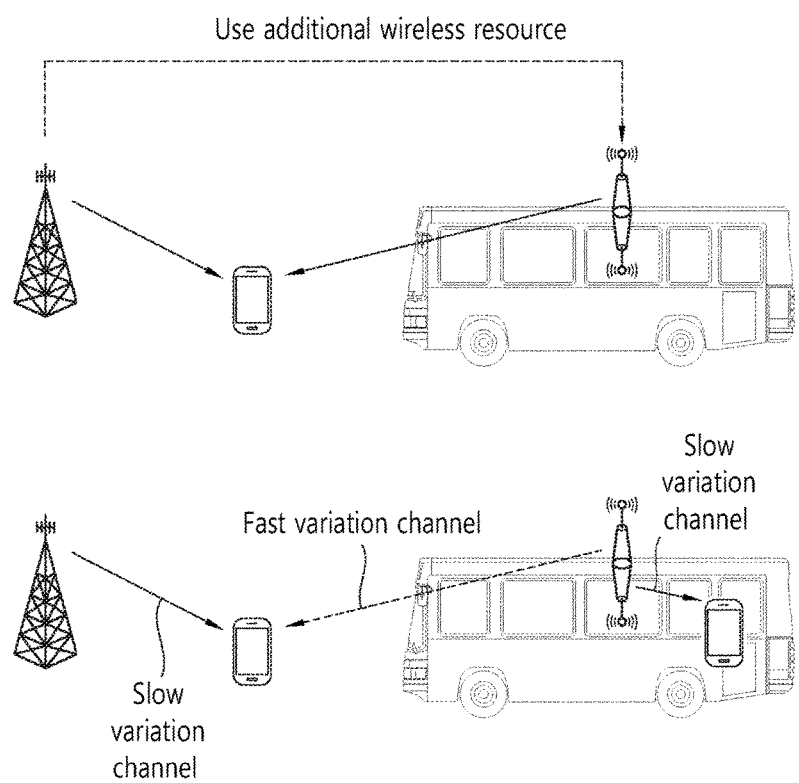
FIG. 3 is a conceptual view illustrating a problem that occurs when interference between a moving cell and a fixed cell is controlled by a conventional inter-cell interference control method.

FIG. 3 is a conceptual view illustrating a problem that occurs when interference between a moving cell and a fixed cell is controlled by a conventional inter-cell interference control method.

In a moving cell, services are frequently provided through real-time traffic. Thus, interference control based on semi-static resource division may be inappropriate for the moving cell.

Referring to the upper part of FIG. 3, a moving cell may be connected to another cell based on a wireless backhaul.

Thus, it may be difficult to use an inter-cell interference mitigation method based on dynamic resource division or cooperative communication through sharing of channel information. Specifically, in joint transmission (JT)/dynamic point selection (DPS), data to be transmitted to a terminal needs to be shared through a wired backhaul between BSs. However, data sharing between a moving cell and a fixed cell through the wireless backhaul needs the use of additional wireless resources and may be difficult to stably achieve according to a wireless channel condition. Thus, it may be difficult to mitigate interference between a fixed cell and a moving cell based on cooperative communication.

Referring to the lower part of FIG. 3, a channel between a moving cell and a fixed cell may be quickly changed by the movement of the moving cell. Thus, it is necessary to develop a technique for controlling and reducing interference in a situation where sharing inter-cell signals and interference channel information is not smoothly performed In this environment, interference whitening through interference randomization or interference averaging, instead of interference avoidance, may be used.

Inter-cell interference randomizing is a method of randomizing interferences from neighboring cells to approximate inter-cell interference by additive white Gaussian noise (AWGN). Inter-cell interference randomizing may reduce the effect of a channel decoding process by a signal from another user, for example, based on cell-specific scrambling and cell-specific interleaving.

Inter-cell interference averaging is a method of averaging all interferences from neighboring cells or averaging inter-cell interferences at channel coding block level through symbol hopping.

According to an interference randomization technique according to one embodiment of the present invention, in transmitting desired signals through time/frequency/space resources, desired signals and interference signals are simultaneously received through some resources and only desired signals are received through some resources, thereby adjusting a ratio between desired signals and interference signals to vary in each resource. The signal-to-interference-plus-noise ratio (SINR) is changed in each resource, thereby obtaining a channel coding gain.

Figure 4:
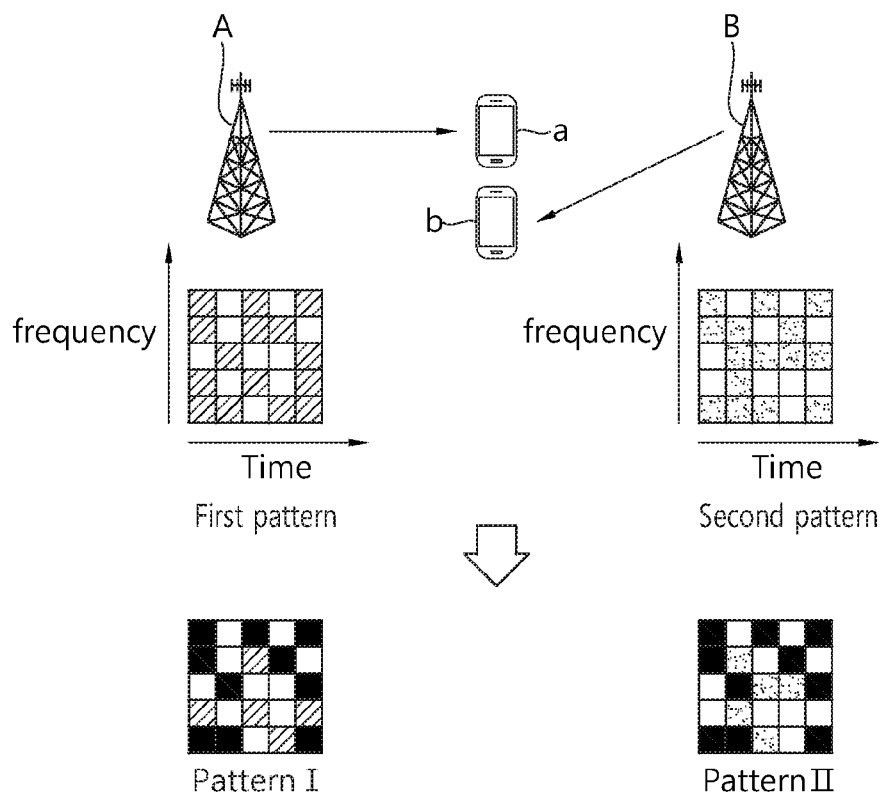
FIG. 4 illustrates an interference mitigation method according to one embodiment of the present invention.
Figure 5:
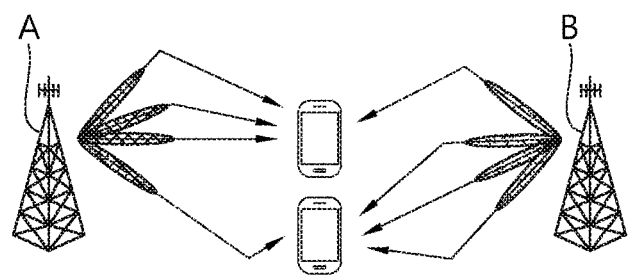
FIG. 5 illustrates an interference mitigation method according to another embodiment of the present invention.

FIGS. 4 and 5 illustrate an interference mitigation method according to one embodiment of the present invention.

In FIG. 4, a first BS A and a second BS B transmit signals to a first terminal a and a second terminal b, respectively. A signal transmitted from the first BS A may act as an interference signal to the second terminal b, and a signal transmitted from the second BS B may act as an interference signal to the first terminal a.

The first BS A and the second BS B may allocate signals to transmit to time and frequency resources, thereby generating and transmitting signals in illustrated resource patterns.

The first BS A allocates and transmits resources in a first pattern to the first terminal a, and the second BS B allocates and transmits resources in a second pattern to the second terminal b.

Even though the first BS A allocates the first pattern of resources to transmit signals, the first terminal a receives a resource allocation pattern that is pattern I in the lower part of FIG. 4 due to signals generated from the second BS B. Further, even though the second BS B allocates the second pattern of resources to transmit signals, the second terminal b receives a resource allocation pattern that is pattern II in the lower part of FIG. 4 due to signals generated from the first BS A.

Pattern I and pattern II in FIG. 4 include parts receiving signals without interference and parts simultaneously receiving signals and interference. Such a method of randomizing interference by changing transmission energy by resources has a disadvantage of not using some resources.

FIG. 5 illustrates that two BSs transmit signals to terminals using a spatial domain.

As illustrated, a first BS A and a second BS B transmit signals using a spatial diversity, in which a signal transmitted from the first BS A and a signal transmitted from the second BS B may be received by respective terminals a and b as desired signals, instead of interference, or may act as interference signals.

An interference randomization method illustrated in FIG. 5 may consume unnecessary energy to cause a decrease in transmission efficiency.

To overcome disadvantages of interference randomization in FIGS. 4 and 5, a method of performing interference randomization by increasing a variation of an interference signal received along with a desired signal without changing the use of resources may be proposed.

This interference randomization technique is applicable between transmitters performing spatial-diversity transmission, in which interference randomization is performed by setting different repeated transmission patterns of repeatedly transmitted symbols for BSs in order to obtain a spatial diversity gain.

An embodiment of the present invention provides a method of diversifying an interference signal affecting de-precoding of each symbol, changing the signal-to-interference ratio (SIR) of a signal in a quasi-static channel section, and securing interference diversity in the quasi-static channel section to obtain a diversity gain.

Generally, signal diversity refers to the standardization of received powers of signals by repetitively transmitting and receiving the same information through various channels. In signal diversity, an SINR change is reduced in a fading channel, and accordingly it is more likely to reconstruct information in the fading channel.

Interference diversity according to the present invention is conceptually similar to signal diversity, in which multiple interferences are simultaneously received through different channels to standardize the received powers of the interferences and an SINR change by interference is reduced. Accordingly, when the received power of an interference signal is high, the diversity gain of a signal is high.

Figure 6:
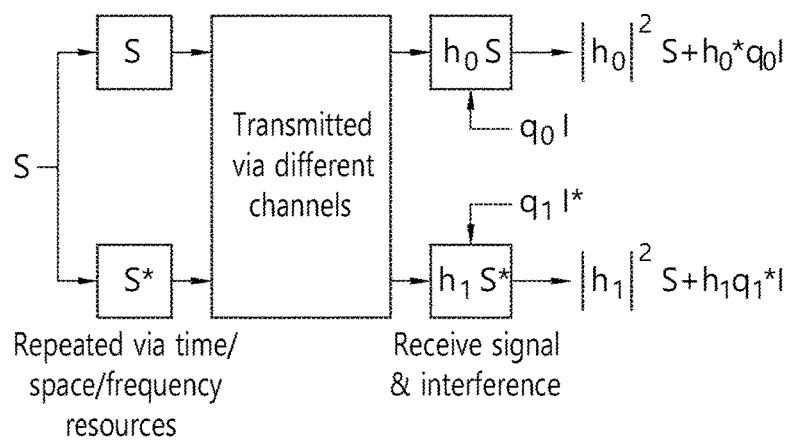
FIG. 6 illustrates that a signal is repetitively transmitted through different channels.

FIG. 6 illustrates that a signal is repetitively transmitted through different channels.

As illustrated, a transmitting end may transmit one transmission symbol (S, hereinafter, 'first symbol') and one modified symbol (S*, hereinafter, 'second symbol') to a receiving end, such as a terminal, through different channels, for example, different antennas. Here, the second symbol is the complex conjugate of the first symbol.

$h_0$ denotes a channel for a symbol between an antenna to transmit the first symbol and the receiving end, and $h_1$ denotes a channel for a symbol between an antenna to transmit the second symbol and the receiving end.

Here, I denotes an interference signal, and I* denotes the complex conjugate of the interference signal. $q_0$ denotes a channel for an interference signal between the antenna to transmit the first symbol and the receiving end, and $q_1$ denotes a channel for an interference signal between the antenna to transmit the second symbol and the receiving end.

The first symbol and the second symbol may be allocated to time, space, or frequency resources to be repetitively transmitted, and the transmitting end may receive a signal and interference.

As illustrated, when the first symbol is transmitted, the receiving end may receive $|h_0|^2 S + h_0^* q_0 I$ along with an interference signal. When the second symbol is transmitted, the receiving end may receive $|h_1|^2 S + h_1 q_1^* I$ along with an interference signal.

Ultimately, a symbol and an interference signal received by the receiving end may be represented by Equation 1.

$$\frac{|h_0|^2 + |h_1|^2}{2} S + \frac{(h_0^* q_0 + h_1 q_1^*) I}{2} \quad \text{[Equation 1]}$$

When a channel is in a semi-static state, in which the channel hardly changes, an interference diversity effect is reduced.

Figure 7:
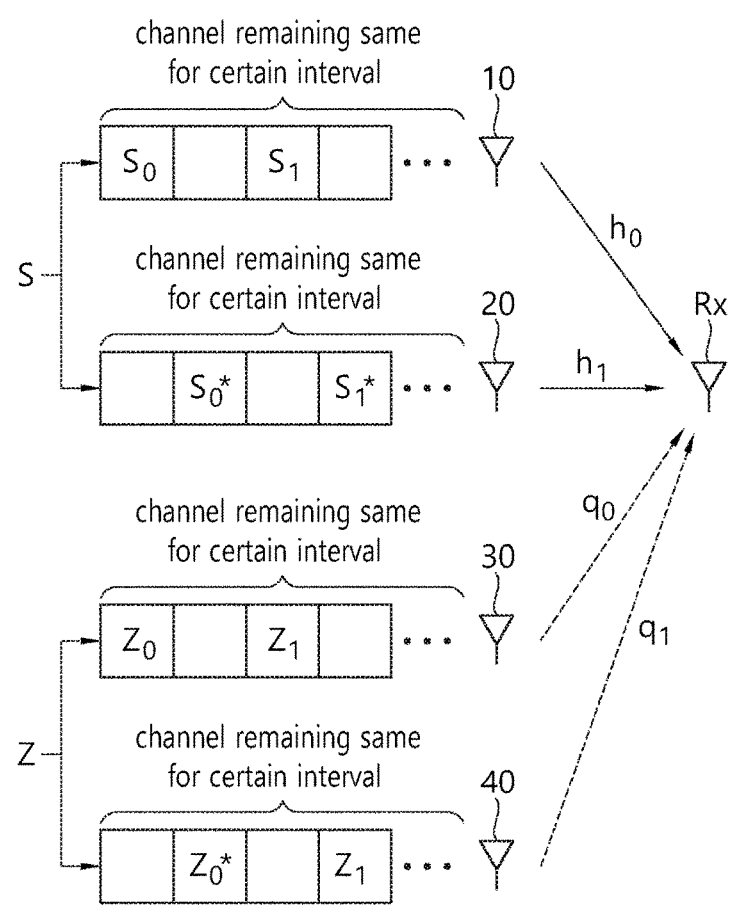
FIG. 7 illustrates a symbol and an interference signal received through a quasi-static channel.

FIG. 7 illustrates a symbol and an interference signal received through a semi-static channel.

As illustrated, a terminal 100, which is a receiving end, may receive symbols (S) transmitted through two antennas and may receive signals transmitted through two antennas as interference signals (Z).

A first antenna 10 and a second antenna 20 may be antennas of a cell (hereinafter, 'first cell') providing a service to the terminal 100, and a third antenna 30 and a fourth antenna 40 may be antennas of a cell (hereinafter, 'second cell') transmitting symbols (Z) acting as interference signals to the terminal 100.

For example, when a fixed cell acts as an interference source to a terminal served by a moving cell, the first cell may be the moving cell and the second cell may be the fixed cell. On the contrary, when a moving cell acts as an interference source to a terminal served by a fixed cell, the first cell may be the fixed cell and the second cell may be the moving cell.

In FIG. 7, a row for symbols may denote time, space, or frequency resources for transmitting the symbols.

In a semi-static channel that remains the same for a certain interval, symbols S0, S1, etc. are transmitted through the first antenna 10, and modified symbols $S_0^*$, $S_1^*$, etc. of the symbols transmitted through the first antenna 10 are transmitted through the second antenna 20.

Symbols $Z_0$, $Z_1$, etc. are transmitted through the third antenna 30, and modified symbols $Z_0^*$, $Z_1^*$, etc. of the symbols transmitted through the third antenna 30 are transmitted through the fourth antenna 40.

For the terminal, the transmission symbols (S) transmitted in the first cell may be reception signals and the transmission symbols (Z) transmitted in the second cell may be interference signals.

Thus, in FIG. 7, $h_0$ denotes a channel between the first antenna 10 of the first cell and the terminal 100 served by the first cell; $h_1$ denotes a channel between the second antenna 20 of the first cell and the terminal 100 served by the first cell; $q_0$ denotes a channel between the third antenna 30 of the second cell and the terminal 100; and $q_1$ denotes a channel between the fourth antenna 40 of the second cell and the terminal 100.

Ultimately, reception symbols ($\hat{S}_0, \hat{S}_1$) received by the terminal may be represented by Equation 2.

$$\hat{S}_0 = S_0 + \frac{(h_0^* q_0 + h_1 q_1^*) Z_0}{|h_0|^2 + |h_1|^2} \quad \text{[Equation 2]}$$

$$\hat{S}_1 = S_1 + \frac{(h_0^* q_0 + h_1 q_1^*) Z_1}{|h_0|^2 + |h_1|^2}$$

Referring to Equation 2, since the interference signals acting as interference to the reception symbols include the same coefficient $$\left( \frac{(h_0^* q_0 + h_1 q_1^*)}{|h_0|^2 + |h_1|^2} \right)$$

in the two symbols ($\hat{S}_0, \hat{S}_1$), it is considered that the symbols have the same SIR.

This means that a gain from the diversity of the entire packet is limited or reduced. When interference is significant in the semi-static channel, the terminal may continuously receive strong interference.

Hereinafter, a method of securing interference diversity by changing a repetitive pattern of an interference symbol, instead of with the same level of interference, is described.

Figure 8:
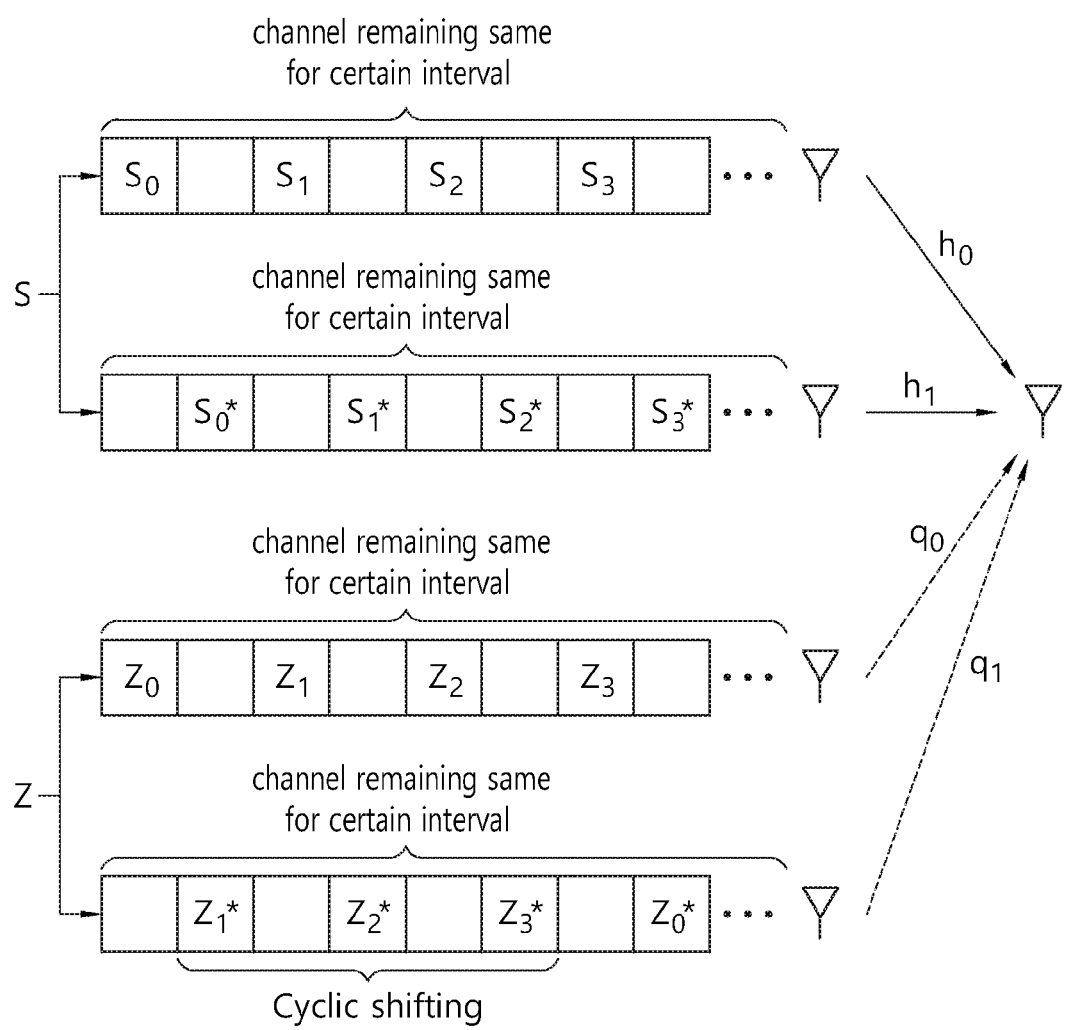
FIG. 8 illustrates a reception symbol and an interference signal according to one embodiment of the present invention.

FIG. 8 illustrates a reception symbol and an interference signal according to one embodiment of the present invention.

As illustrated, in a semi-static channel that remains the same for a certain interval, symbols $S_0$, $S_1$, $S_2$, $S_3$, etc. are transmitted through a first antenna 10, and modified symbols $S_0^*$, $S_1^*$, $S_2^*$, $S_3^{**}$, etc. of the symbols transmitted through the first antenna are transmitted through a second antenna 20.

Symbols $Z_0$, $Z_1$, $Z_2$, $Z_3$, etc. are transmitted through a third antenna 30, and modified symbols $Z_1^*$, $Z_2^*$, $Z_3^*$, $Z_0^*$, etc. of the symbols transmitted through the third antenna are transmitted through a fourth antenna 40.

According to the embodiment of the present invention, the symbols transmitted through the fourth antenna are transmitted in order of $Z_1^*$, $Z_2^*$, $Z_3^*$, $Z_0^*$, etc. via the cyclic-shift of a conventional pattern of $Z_0^*$, $Z_1^*$, $Z_2^*$, $Z_3^*$. That is, a repetitive pattern of symbols that may act as interference signals to the terminal may be changed according to a certain order.

The repetitive pattern may be changed by a first cell and a second cell, which are transmitting ends, using different precoders.

When the repetitive pattern of symbols is changed, reception symbols ($\hat{S}_0, \hat{S}_1$) received by the terminal may be represented by Equation 3.

$$\hat{S}_0 = S_0 + \frac{h_0^* q_0 Z_0 + h_1 q_1^* Z_2}{|h_0|^2 + |h_1|^2} \quad \text{[Equation 3]}$$

$$\hat{S}_1 = S_1 + \frac{h_0^* q_0 Z_1 + h_1 q_1^* Z_3}{|h_0|^2 + |h_1|^2}$$

Referring to Equation 3, the reception symbols ($\hat{S}_0, \hat{S}_1$) include different interference symbols acting as interference, which means that interference changes by each symbol in the semi-static interval. Accordingly, it is possible to secure interference diversity for a packet and to improve diversity performance.

Figure 9:
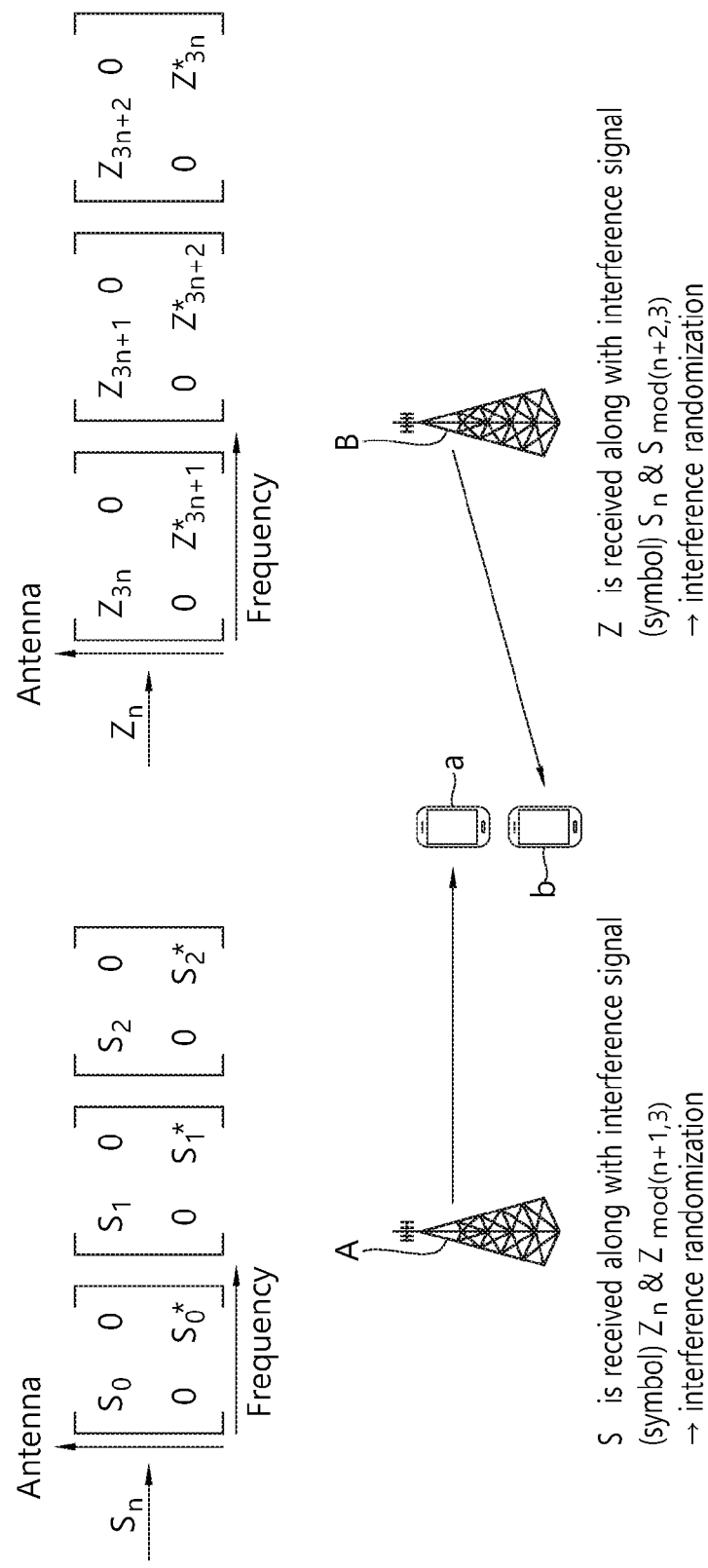
FIG. 9 illustrates interference randomization in accordance with a transmission signal according to FIG. 8.

FIG. 9 illustrates interference randomization in accordance with a transmission signal according to FIG. 8.

According to the inter-cell interference mitigation method of FIG. 8, when symbols are repeated, a BS may perform precoding using different repetitive patterns. The top left of FIG. 9 illustrates a precoding matrix of a pattern of symbols generated by a first BS A, which may be represented by Equation 4 or Equation 5.

$$\begin{bmatrix} x_n & 0 \\ 0 & x_n^* \end{bmatrix}$$ [Equation 4]

$$\begin{bmatrix} x_{3k} & 0 & x_{3k+1} & 0 & x_{3k+2} & 0 \\ 0 & x_{3k} & 0 & x_{3k+1} & 0 & x_{3k+2} \end{bmatrix}$$ [Equation 5]

As illustrated, the first BS A sequentially transmits symbols S and modified symbols S* of the symbols S with respect to the same signal through different antennas. That is, when symbol $S_0$ is transmitted through one antenna, symbol $S_0^*$ is transmitted through another antenna. Further, when symbol $S_1$ is sequentially transmitted through the antenna used to transmit the symbol $S_0$, symbol $S_1^*$ is transmitted through the other antenna.

Meanwhile, a symbol pattern generated by a second BS B may be modified as in the top right of FIG. 9. The second BS B may repetitively transmit the symbol pattern through two antennas with a period of 3 and an offset set for the order of transmitted symbols.

In the symbol pattern generated by the second BS B, a number of symbols of 3, that is, a period of 3, the number of symbols in a repetitive pattern is 3, that is, the period is 3, and the offset of the order of transmitted symbols is set to 1. That is, symbols $Z_0$, $Z_1$, $Z_2$, $Z_3$, etc. may be sequentially transmitted through one antenna, and modified symbols thereof may be transmitted through another antenna in a sequence of $Z_1^*$, $Z_2^*$, $Z_0^*$, $Z_4^*$, etc., instead of the preceding sequence of $Z_0$, $Z_1$, $Z_2$, $Z_3$, etc.

This pattern may be represented as a precoding matrix by Equation 6.

$$\begin{bmatrix} x_{3k} & 0 & x_{3k+1} & 0 & x_{3k+2} & 0 \\ 0 & x_{3k+1} & 0 & x_{3k+2} & 0 & x_{3k} \end{bmatrix}$$ [Equation 6]

Alternatively, the second BS B may generate a signal by applying precoding in which the number of symbols in a repetitive pattern is 3, that is, the period is 3, and the offset of the order of transmitted symbols is set to 2. That is, symbols $Y_0$, $Y_1$, $Y_2$, $Y_3$, etc. may be sequentially transmitted through one antenna, and modified symbols thereof may be transmitted through another antenna in a sequence of $Y_2^*$, $Y_0^*$, $Y_1^*$, $Y_5^*$, etc., instead of the preceding sequence of $Y_0$, $Y_1$, $Y_2$, $Y_3$, etc.

This pattern may be represented as a precoding matrix by Equation 7.

$$\begin{bmatrix} x_{3k} & 0 & x_{3k+1} & 0 & x_{3k+2} & 0 \\ 0 & x_{3k+2} & 0 & x_{3k} & 0 & x_{3k+1} \end{bmatrix}$$ [Equation 7]

The same offset or different offsets may be applied to respective cells, and the same period or different periods may be applied to respective cells.

Further, cells using the same transmitting antenna port may use different sizes of precoders according to a cyclic shift period.

For example, in Equation 6 or Equation 7, a cyclic shift period of symbol repetition may be 3, which may be 4 or greater. When the period is set, an offset may be set to a value of up to "period-1."

In precoding a signal, cells, which may act as interference resources to each other, may preset a procoder as in Equations 4 to 7 to variously modify a repetitive pattern of symbols. Accordingly, interference diversity may be secured, thus improving signal received capability and preventing a decrease in the performance of a received signal by strong interference.

A first terminal a may obtain an interference randomization effect by receiving Sn, Zn as an interference signal, and Zmod(n+1, 3) together, and a second terminal b may obtain an interference randomization effect by receiving Zn, Sn as an interference signal, and Smod(n+2, 3) together.

Meanwhile, the closed-loop MIMO scheme described with reference to FIG. 1 does not operate in the absence of information on interference or information on a channel transmitting an interference signal. The interference randomization scheme described with reference to FIGS. 8 and 9 may not be used when the closed-loop MIMO scheme is used to transmit a desired signal.

Hereinafter, a transmission scheme and a transmitter structure are proposed to use an inter-cell interference randomization scheme in an environment where the closed-loop MIMO scheme is used to transmit a desired signal.

The following interference randomization scheme may be applied to a small cell suitable for the use of closed-loop MIMO, a moving cell performing downlink transmission between low-speed moving users, or a closed femtocell. That is, according to one embodiment of the present invention, interference between downlink cells that occurs by downlink transmission by a cell restricted from exchanging information with a small cell may be overcome.

Figure 10:
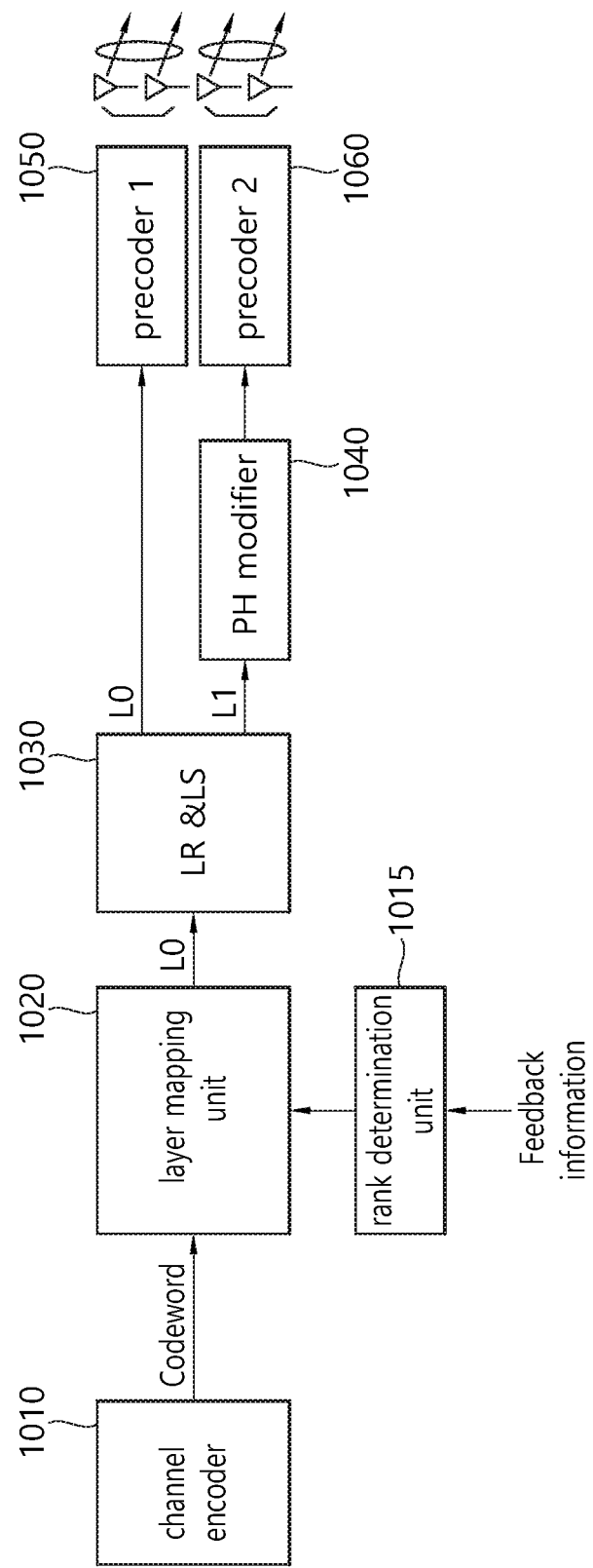
FIG. 10 illustrates a structure of a transmitter according to one embodiment of the present invention.

FIG. 10 illustrates a structure of a transmitter according to one embodiment of the present invention.

In a small cell environment where a BS and a terminal are close to each other, a line of signal is created with high probability, which may mean that closed-loop MIMO transmission in a single layer beamforming form frequently occurs. Since the foregoing inter-cell interference randomization is not suitable for a conventional transmitter structure which does not repetitively transmit symbols, the present embodiment proposes the transmitter structure illustrated in FIG. 10.

As illustrated, the transmitter includes a channel encoder 1010, a rank determination unit 1015, a layer mapping unit 1020, a layer repeat and layer shift (hereinafter, LR&LS) 1030, a phase modifier 1040, and precoders 1050 and 1060.

The channel encoder 1010 encodes input information bits according to a given coding scheme to generate a codeword.

The channel encoder 1010 may further include a mapping unit that modulates each code according to a modulation scheme to be mapped to modulated symbols with demodulation values. The modulation scheme may be m-phase shift keying (m-PSK) or m-quadrature amplitude modulation (m-QAM), without being limited. For example, m-PSK may be BPSK, QPSK, or 8-PSK. m-QAM may be 16-QAM, 64-QAM, or 256-QAM. The mapping unit generates modulated symbols of a codeword.

The rank determination unit 1015 may determine the number of ranks based on feedback information transmitted from a terminal.

The layer mapping unit 1020 maps modulated symbols of input codewords to each layer according to the number of ranks. A layer may be a path for information input to the precoders 1050 and 1060 and may correspond to a rank value. The layer mapping unit 140 may map modulated symbols of each codeword to each layer corresponding to the number of ranks (that is, rank) determined by the rank determination unit 1050.

If the rank is 1, the layer mapping unit 1020 generates a transmission sequence corresponding to the rank of 1, in which a transmission sequence for one layer (L0) may be generated based on the feedback information, as illustrated.

The generated transmission sequence is input to the LR&LS 1030, and the LR&LS 1030 repeatedly outputs the transmission sequence. Thus, although the rank is set to 1, an effect may occur like generating two layers.

The LR&LS 1030 may repeat the transmission sequence for inter-cell interference randomization before the transmission sequence is mapped to an antenna port through precoding. Symbols of the transmission sequence may be repeated as many times as the number of antenna port groups used to realize a transmission diversity and may be allocated to an individual antenna port group. An antenna port group may include a plurality of antennas, and the number of antenna port groups may correspond to the number of precoders or may refer to the number of layers.

Figure 11B:
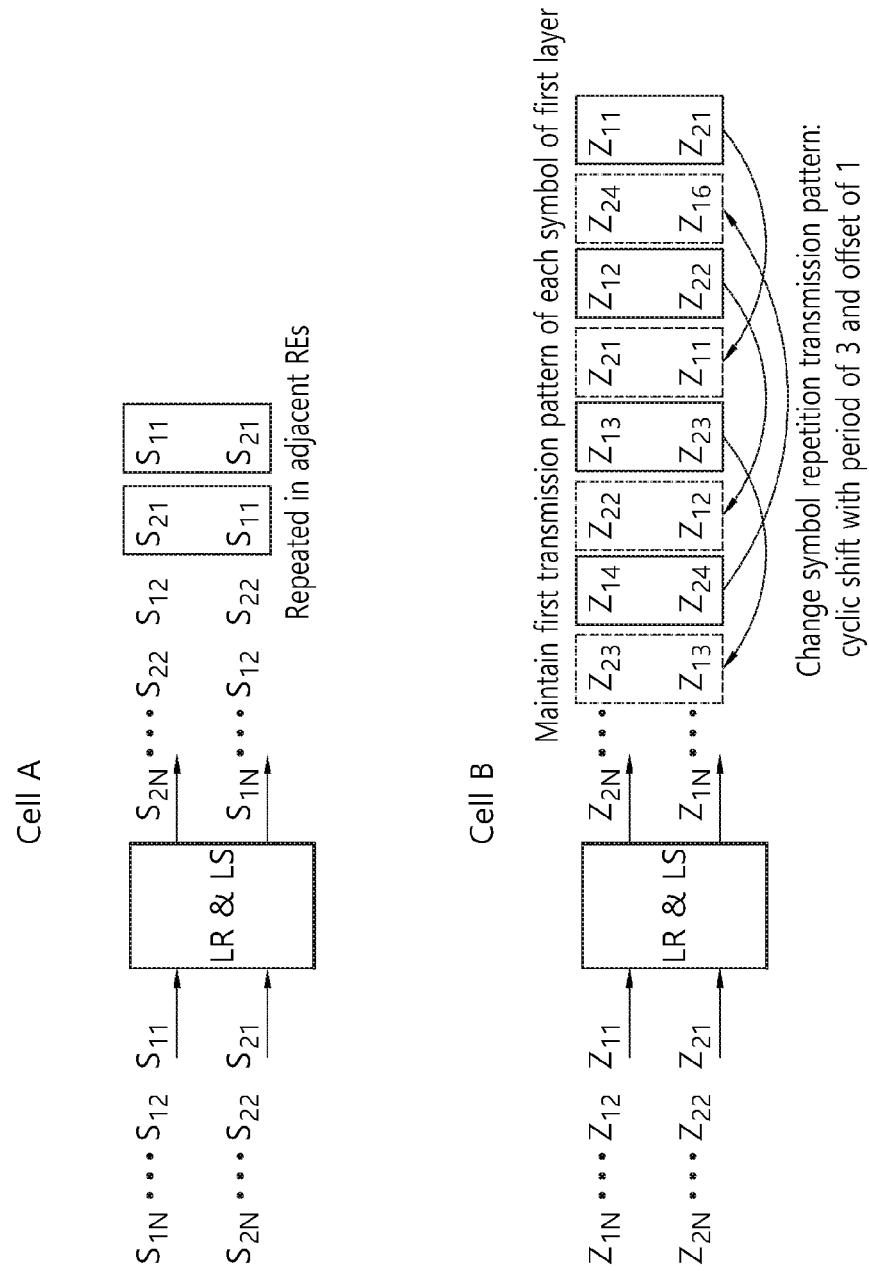
FIG. 11b illustrates a repeated transmission sequence according to one embodiment of the present invention.
Figure 11C:
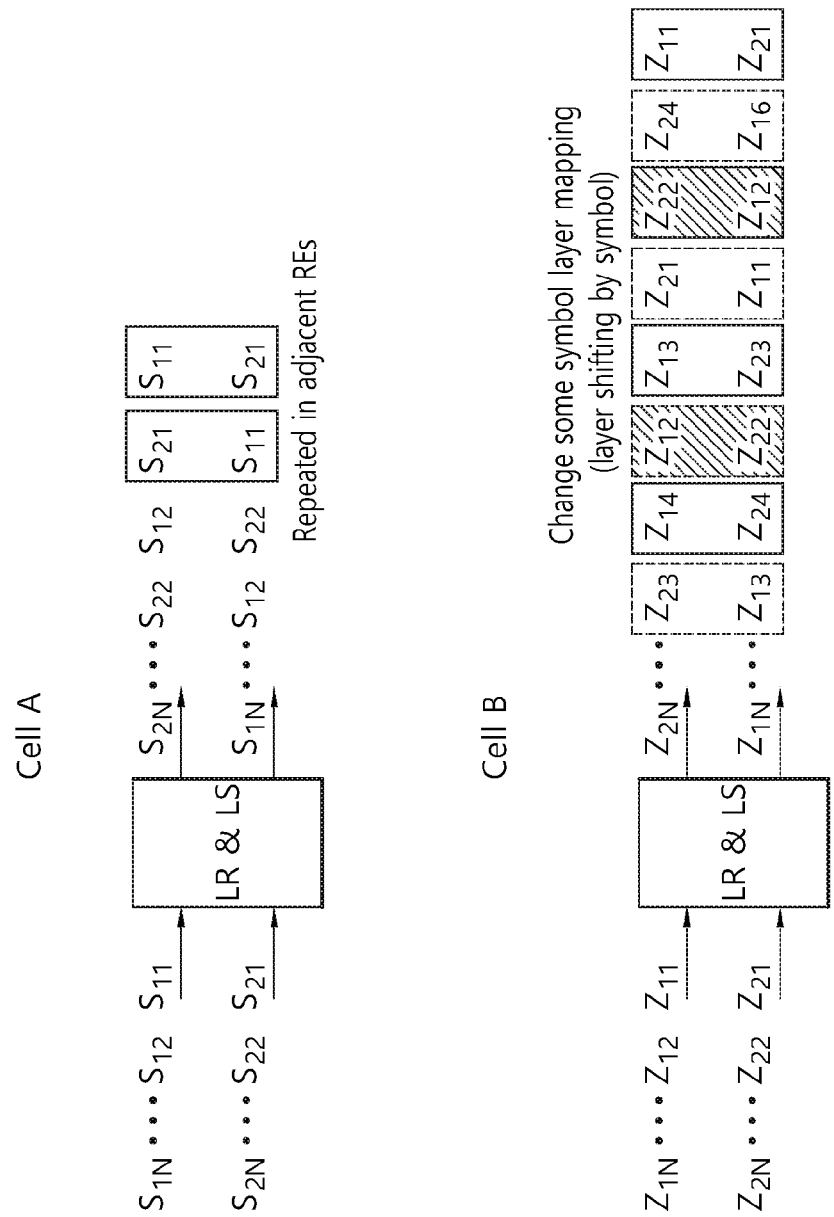
FIG. 11c illustrates a repeated transmission sequence according to one embodiment of the present invention.

FIGS. 11a to 11c illustrate a layer repetition and a layer shift according to one embodiment of the present invention. FIGS. 11a to 11c illustrate a repetitive transmission sequence according to the present embodiment.

As illustrated in FIG. 11a, when a transmission sequence $S_{1N}, \ldots S_{12}, S_{11}, S_{2N} \ldots S_{22}$, and $S_{21}$ generated in the channel encoder is input to the LR&LS 1030, the transmission sequence may be expressed as if two layers $S_{1N}, \ldots S_{12}$, and $S_{11}$ and $S_{2N} \ldots S_{22}$, and $S_{21}$ are generated.

The transmission sequence $S_{1N}, \ldots S_{12}$, and $S_{11}$ and $S_{2N} \ldots S_{22}$, and $S_{21}$ expressed as two layers may be repeated by the LR&LS 1030, and repeated symbols may be shifted at regular intervals in the transmission sequence.

The transmission sequence may be repeated as many times as the number of antenna port groups. Repeated symbols may be allocated to each antenna port in an order to be mapped to adjacent neighboring REs as in cell A illustrated in the upper part of FIG. 11a or to be spaced by one RE as in cell B illustrated in the lower part of FIG. 11b. That is, repeated symbols in the transmission sequence may be allocated to REs spaced by a preset number K (K is an integer).

Further, as illustrated in FIG. 11a, inter-cell interference randomization may be achieved by setting different repetitive patterns allocated to antenna port groups in each cell. Accordingly, an inter-cell interference randomization effect may be obtained even in closed-loop MIMO.

According to an embodiment in FIG. 11b, repetitive patterns may be allocated to be mapped to adjacent neighboring REs in cell A as in the upper part of FIG. 11b. In cell B illustrated in the lower part of FIG. 11b, one of transmission sequences expressed as two layers maintains an input pattern, that is, a transmission sequence $Z_{1N}, \ldots Z_{12}$, and $Z_{11}$ maintains the first input transmission pattern, and the other transmission sequence $Z_{2N} \ldots Z_{22}$, and $Z_{21}$ has a modification in a repetitive transmission pattern of symbols. The repetitive pattern has a period of 3 and is cyclicly shifted with an offset of 1.

Alternatively, according to an embodiment in FIG. 11c, repetitive patterns may be allocated to be mapped to adjacent neighboring REs in cell A of the upper part. In cell B of the lower part, one of transmission sequences expressed as two layers maintains an input pattern, that is, a transmission sequence $Z_{1N}, \ldots Z_{12}$, and $Z_{11}$ maintains the first input transmission pattern, and the other transmission sequence $Z_{2N} \ldots Z_{22}$, and $Z_{21}$ has a modification in a repetitive transmission pattern of symbols as illustrated in FIG. 11b. The transmission sequence $Z_{2N} \ldots Z_{22}$, and $Z_{21}$ has a pattern with mapping of some symbols shifted from the pattern illustrated in the lower part of FIG. 11b. That is, symbols Z12 and Z22 are transposed from the pattern illustrated in the lower part of FIG. 11b. The transmission patterns of cell B in FIG. 11c may be an example of a shift in layer mapping by symbols.

The phase modifier 1040 changes the phase of a repeated and shifted transmission sequence. As illustrated, to obtain an effect of outputting two layers with a rank determined to be 1, orthogonality between the layers needs to be guaranteed. The phase modifier 1040 modifies the phases of transmission sequences output in two layers to generate orthogonal sequences in order to achieve orthogonality between the two layers.

Figure 12:
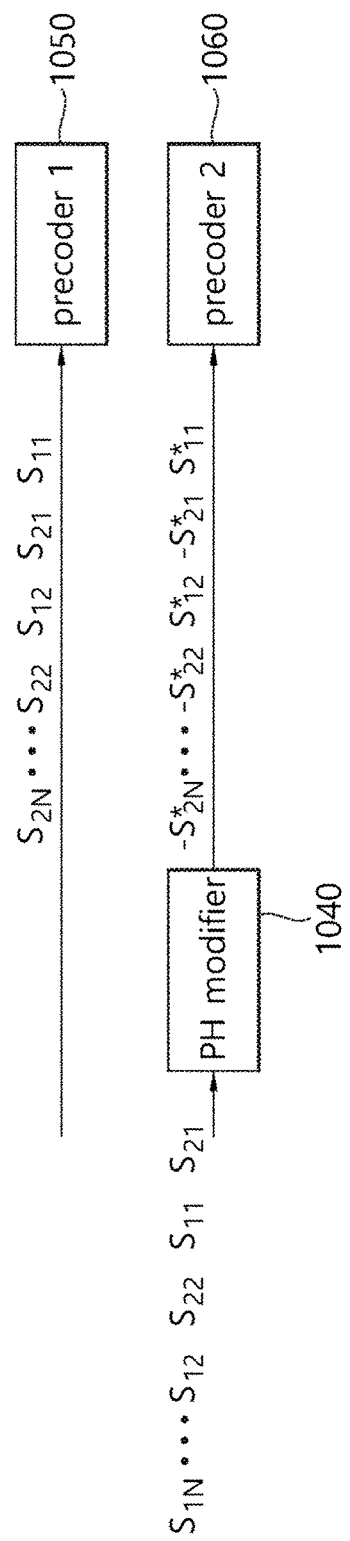
FIG. 12 illustrates a transmission sequence with a phase modified according to one embodiment of the present invention.

FIG. 12 illustrates a transmission sequence with a phase modified according to one embodiment of the present invention.

As illustrated, the phase of a transmission sequence input to a first precoder 1050 may not be changed, and the phase of a transmission sequence input to a second precoder 1060 may be changed.

Such orthogonal sequences may be allocated to time, frequency, or space resources, and the phase modifier 1040 may be configured as an Alamouti transmitter. The transmission sequence input to the second precoder 1060 of FIG. 12 may be allocated to space resources via complex operations or reversing the phase thereof.

The precoders 1050 and 1060 may process a mapping symbol mapped to each layer using an MIMO scheme according to a plurality of antenna ports to output an antenna-specific symbol. As illustrated, according to the present embodiment, there are two antenna port groups and an effect of generating and outputting two layers for a signal with a rank of 1 occurs.

Figure 13:
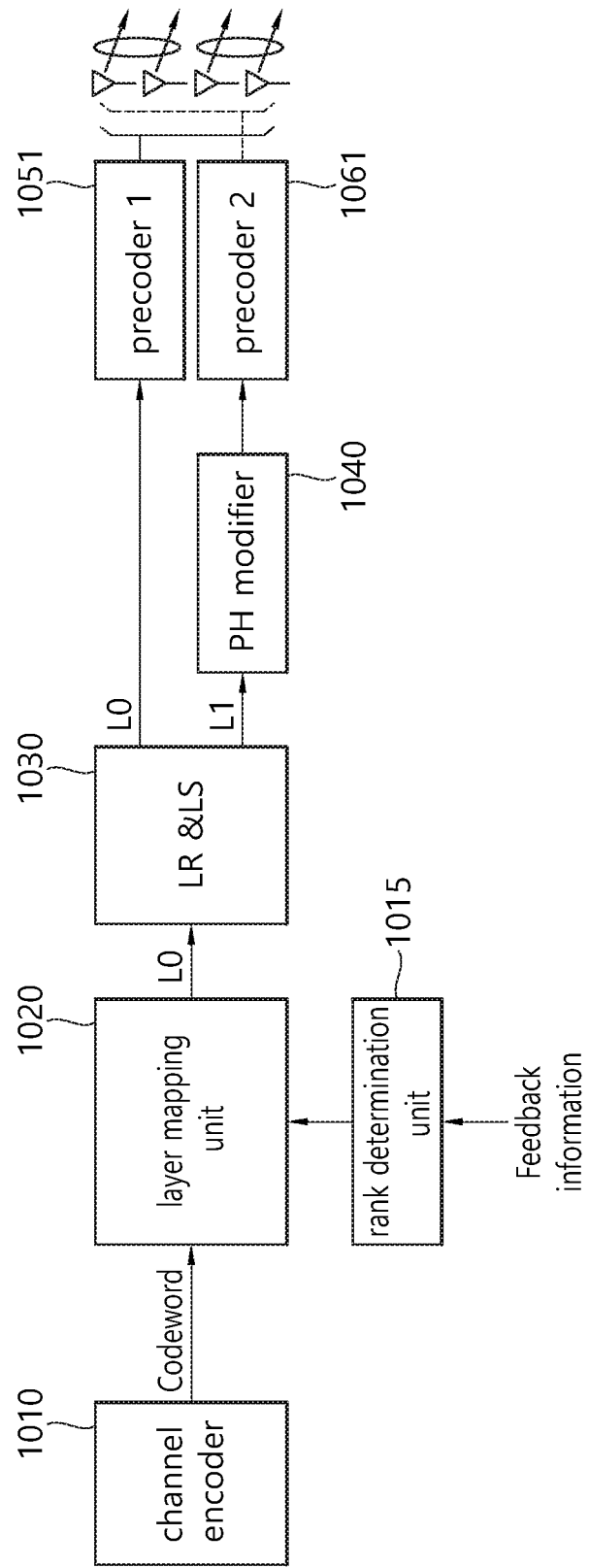
FIG. 13 illustrates a structure of a transmitter according to another embodiment of the present invention.

FIG. 13 illustrates a structure of a transmitter according to another embodiment of the present invention.

Referring to FIG. 13, a repetitive transmission sequence may be transmitted using one antenna port group in the same manner as in signal-layer transmission, instead of using different antenna ports.

This is possible because the phase modifier 1040 guarantees orthogonality between two layers.

The interference randomization scheme proposed in the present invention guarantees a performance gain in the presence of cell interference that is not measured or not predicted, and the conventional scheme has no effect on an operation in the absence of such unknown inter-cell interference. That is, according to the present invention, it is not needed to perform control to apply the proposed method only when unknown inter-cell interference is expected to occur and not to apply the proposed method otherwise.

Also, a system may be designed to always use the interference randomization scheme for signal transmission or it may be dynamically determined whether to apply the scheme in order to apply the scheme only in a specified case.

In this case, it is preferable that a layer repeat and layer shift pattern or a symbol repetition pattern is set in advance in order to simplify a layer repeat and layer shift pattern for each cell, that is, to avoid overheads of signaling involving complicated negotiations between cells for each cell to have a different repetition pattern than neighboring cells.

According to one embodiment of the present invention, a layer repeat and layer shift pattern may be set depending on a cell type.

For example, a repetition pattern may be set according to a cell size, for example, a small cell or a microcell, or may be set according to a mode of coverage overlapping with another cell, for example, a first layer and a second layer, in a heterogeneous network. Alternatively, a repetition pattern may be set according to the mobility of a cell, for example, a moving cell or a fixed cell, or may be set according to a combination of the foregoing conditions.

When a symbol repetition pattern is set according to a cell size or cell layer, continuous interference randomization may be applied between cells in which strong inter-cell interference is highly likely to occur, in view of the level of inter-cell interference, thereby preparing for a case in which interference may not be controlled by conventional interference avoidance. Further, when a symbol repetition pattern is set according to the mobility of a cell, the pattern may respond to the occurrence of unpredicted inter-cell interference.

Figure 14:
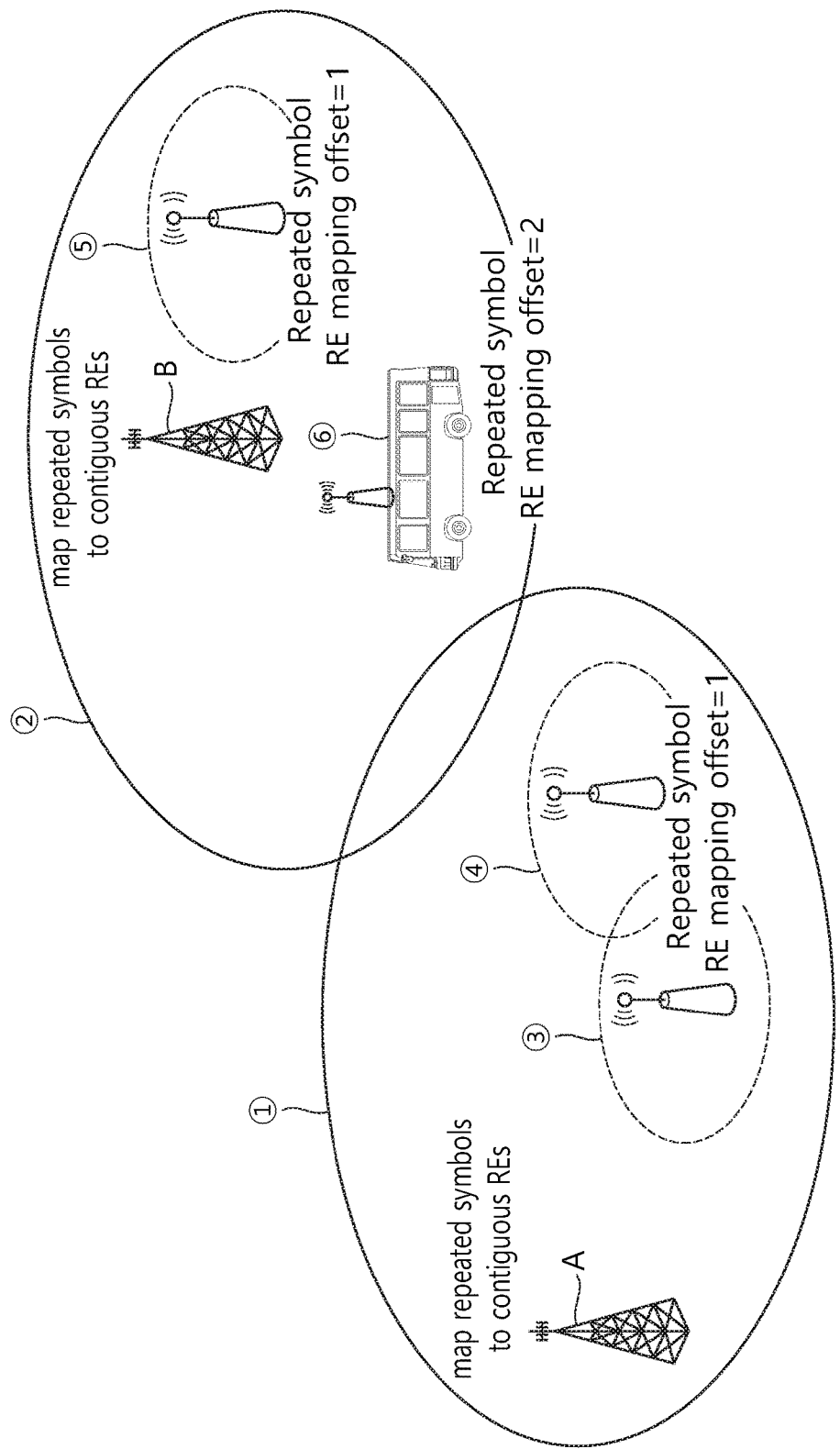
FIG. 14 illustrates the allocation of a repetition pattern corresponding to a cell type according to one embodiment of the present invention.

FIG. 14 illustrates the allocation of a repetition pattern corresponding to a cell type according to one embodiment of the present invention.

As illustrated, a first BS A and a second BS B map repeated symbols to contiguous resource elements (REs) in cells ① and ② managed by the first BS A and the second BS B.

In cells ③, ④, and ⑤, which are small cells, repeated symbols are allocated to REs, being shifted by an offset of 1.

Repeated symbols may be mapped to resources allocated for a moving cell ⑥, being shifted by an offset of 2.

As described above, a symbol repetition pattern may be changed depending on the size of a cell or the mobility of a cell, and the symbol pattern may be changed or newly set by adjusting the offset of the repetition pattern.

According to another embodiment of the present invention, a layer repeat and layer shift pattern may be set depending on a cell ID. In this mode, each cell has a different symbol repetition pattern, which may be realized, for example, as "repetition offset=mod(PCID, K)."

According to still another embodiment of the present invention, when a layer repeat and layer shift pattern is set depending on a cell type or cell ID as mentioned above, cells may set a layer repeat and layer shift pattern using a combination of the cell type and the cell ID or through these methods and may negotiate for a pattern. That is, adjacent cells may negotiate for a precoder to be used by each cell through upper-layer signaling.

After each BS sets an initial pattern to use according to a cell type or cell ID, when interference randomization between adjacent cells having the same pattern is required, the BSs need to negotiate. For example, when a repetition pattern of each cell is set and it is necessary to change a repetition pattern of a specific cell, each BS may determine to change a repetition pattern and may notify a changed pattern to a BS of an adjacent cell through signaling, or one BS may request another BS to change a repetition pattern through signaling between the BSs.

Figure 15:
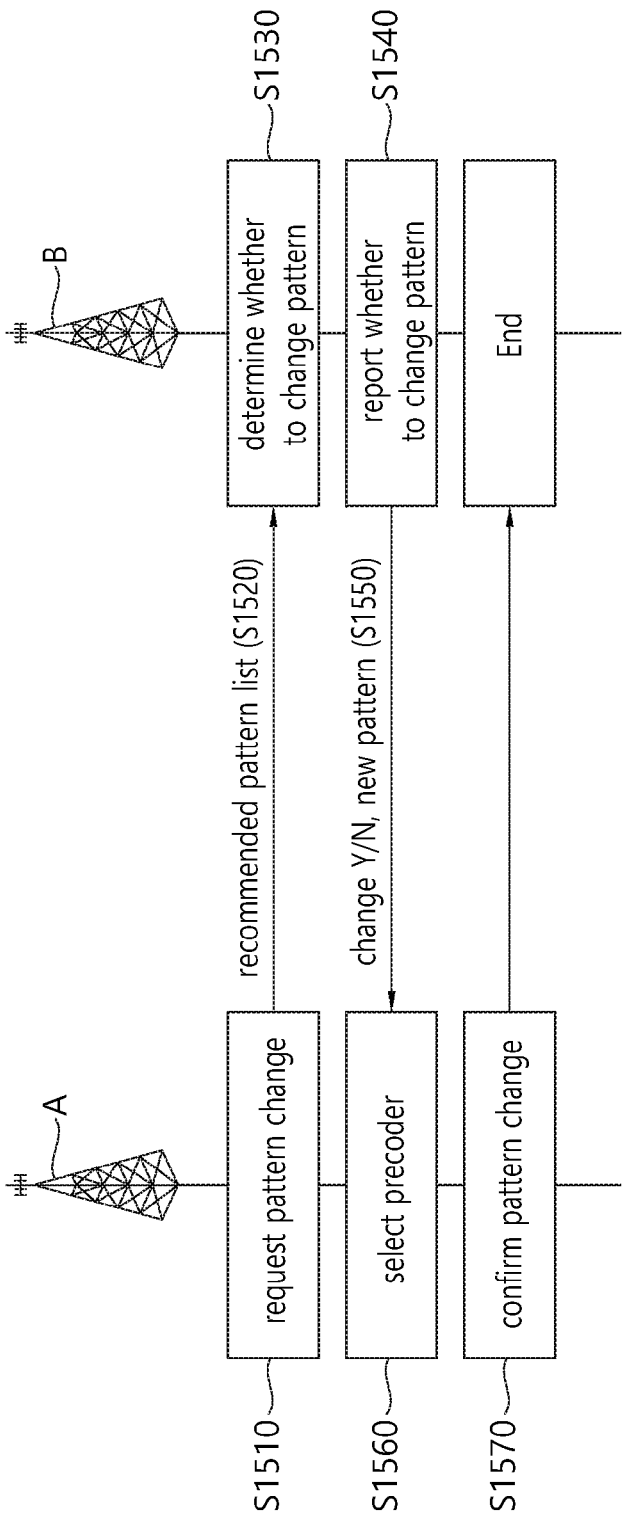
FIG. 15 illustrates a signaling process for a pattern change between BSs according to one embodiment of the present invention.

FIG. 15 illustrates a signaling process for a pattern change between BSs according to one embodiment of the present invention.

As illustrated, when a first BS A has an environment to request a pattern change (S1510), for example, when the first BS receives a request to change a pattern from another BS or needs to transmit a request for a change to a second BS B, the first BS A may signal a recommended pattern list to the second BS B (S1520).

When the recommended pattern list is received, the second BS B determines whether to change a pattern (S1530) and transmits a response to whether to change the pattern to the first BS A (S1540). The second BS B may transmit a response to whether to change the pattern, and information on a new pattern, if determining to change the pattern, to the first BS A (S1550).

The first BS A may select a precoder based on the new pattern (S1560) and may change the pattern according to the selected precoder. The first BS A, which has changed the pattern, may transmit a message confirming the pattern change to the second BS B (S1570).

Figure 16:
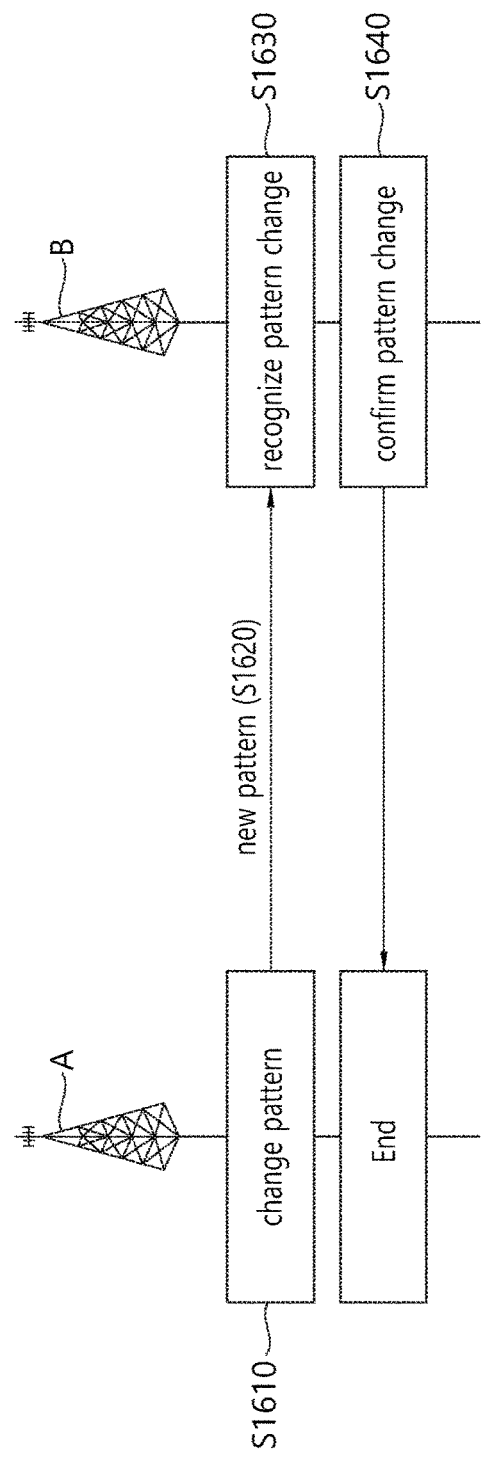
FIG. 16 illustrates a signaling process for a pattern change between BSs according to another embodiment of the present invention.

FIG. 16 illustrates a signaling process for a pattern change between BSs according to another embodiment of the present invention.

When a first BS A changes a symbol repetition pattern (S1610), the first BS A may signal a changed new pattern to a second BS B (S1620).

When the signal on the pattern change is received from the first BS A, the second BS B may recognize the pattern change of the first BS A (S1630) and may confirm the pattern change (S1640).

Figure 17:
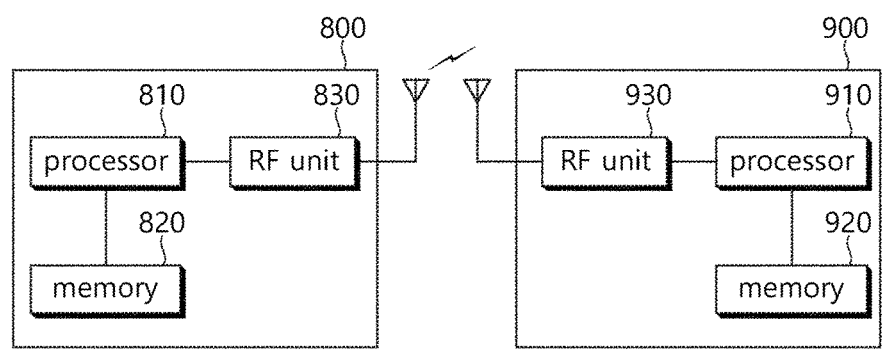
FIG. 17 is a block diagram illustrating a wireless communication system according to one embodiment of the present specification.

FIG. 17 is a block diagram of a wireless communication system according to one embodiment of the present invention.

A BS 800 includes a processor 810, a memory 820, and a radio frequency (RF) unit 830. The processor 810 implements the proposed functions, procedures, and/or methods. Layers of wireless interface protocols may be implemented by the processor 810. The memory 820 is connected with the processor 810 and stores various pieces of information to operate the processor 810. The RF unit 830 is connected with the processor 1110 and transmits and/or receives radio signals.

A terminal 900 includes a processor 910, a memory 920, and a radio frequency (RF) unit 930. The processor 910 implements the proposed functions, procedures, and/or methods. Layers of wireless interface protocols may be implemented by the processor 910. The memory 920 is connected with the processor 910 and stores various pieces of information to operate the processor 910. The RF unit 930 is connected with the processor 1110 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, the present invention provides a method and a device enabling a terminal to select a wireless node for an uplink according to a predetermined condition when wireless connection is possible through different wireless networks.

In the above-described exemplary system, although the methods have been described in the foregoing embodiments on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A signal transmission method comprising:
   determining a rank based on feedback information received from a terminal;
   generating a first transmission sequence for a first antenna port and a second transmission sequence for a second antenna port according to the determined rank;
   generating a repetitive transmission sequence by repeating the generated first transmission sequence and second transmission sequence; and
   transmitting the generated first transmission sequence and the generated repetitive transmission sequence,
   wherein a coefficient of the generated first transmission sequence and a coefficient of the generated second transmission sequence sequentially correspond to a same symbol,
   wherein the generated repetitive transmission sequence is configured such that the coefficient of the generated first transmission sequence and the coefficient of the generated second transmission sequence are allocated to adjacent resource elements, and
   wherein repeated coefficients in the generated repetitive transmission sequence are allocated to different antenna ports.

2. The method of claim 1, further comprising creating orthogonality between the generated first transmission sequence and the generated repetitive transmission sequence by changing a phase of the generated repetitive transmission sequence with respect to the generated first transmission sequence.

3. The method of claim 1, wherein the generated first transmission sequence is repeated as many times as a number of antenna ports.

4. The method of claim 1, wherein a symbol pattern of the repeated coefficients is determined according to a cell identifier.

5. A signal transmission device comprising:
   a signal transceiver configured to transmit and receive signals; and
   a processor connected to the signal transceiver and configured to:
   determine a rank based on feedback information received from a terminal;
   generate a first transmission sequence for a first antenna port and a second transmission sequence for a second antenna port according to the determined rank;
   generate a repetitive transmission sequence by repeating the generated first transmission sequence and second transmission sequence; and
   control the transceiver to transmit the generated first transmission sequence and the generated repetitive transmission sequence,
   wherein a coefficient of the generated first transmission sequence and a coefficient of the generated second transmission sequence sequentially correspond to a same symbol,
   wherein the generated repetitive transmission sequence is configured such that the coefficient of the first transmission sequence and the coefficient of the second transmission sequence are allocated to adjacent resource elements, and
   wherein repeated coefficients in the generated repetitive transmission sequence are allocated to different antenna ports.

6. The transmission device of claim 5, wherein the processor is further configured to create orthogonality between the generated first transmission sequence and the generated repetitive transmission sequence by changing a phase of the generated repetitive transmission sequence with respect to the generated first transmission sequence.

7. The transmission device of claim 5, wherein the generated first transmission sequence is repeated as many times as a number of antenna ports.

8. The transmission device of claim 5, wherein a symbol pattern of the repeated coefficients is determined according to a cell identifier.

* * * * *